United States Patent
Hwang

(10) Patent No.: US 7,686,635 B2
(45) Date of Patent: Mar. 30, 2010

(54) TERMINAL CONNECTED TO LAMP FOR LIQUID CRYSTAL DISPLAY DEVICE AND BACKLIGHT ASSEMBLY HAVING THE SAME

(75) Inventor: Kyu-Bok Hwang, Gwangmyeong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/118,210

(22) Filed: May 9, 2008

(65) Prior Publication Data

US 2008/0278654 A1 Nov. 13, 2008

(30) Foreign Application Priority Data

May 9, 2007 (KR) .................. 10-2007-0044869

(51) Int. Cl.
*H01R 33/08* (2006.01)

(52) U.S. Cl. ...................... 439/242; 439/874

(58) Field of Classification Search ............... 439/242, 439/881, 874, 855, 854; 362/225, 600–634
See application file for complete search history.

(56) References Cited

U.S. PATENT DOCUMENTS

| | | | |
|---|---|---|---|
| 5,610,472 A * | 3/1997 | Schmitt, Jr. ............. | 313/318.12 |
| 6,420,656 B1 * | 7/2002 | Sugiyama et al. ....... | 174/110 R |
| 2006/0063410 A1 * | 3/2006 | Lin ........................... | 439/242 |

* cited by examiner

*Primary Examiner*—Khiem Nguyen
(74) *Attorney, Agent, or Firm*—Cantor Colburn LLP

(57) ABSTRACT

A terminal includes a supporting plate, a holding member, a connection portion and a receiving portion. The terminal is connected to a lamp for a liquid crystal display (LCD) device. The holding member protrudes from a side of the supporting plate to surround a wire. The connection portion protrudes from an upper portion of the supporting plate and is bent to hold an electrode of the lamp. The receiving portion protrudes from the connection portion and is bent to be held by the holding member with the wire. Therefore, separation of the lamp from the terminal is prevented.

18 Claims, 5 Drawing Sheets

TERMINAL CONNECTED TO LAMP FOR LIQUID CRYSTAL DISPLAY DEVICE AND BACKLIGHT ASSEMBLY HAVING THE SAME

CROSS-REFERENCE TO RELATED APPLICATIONS

The present application claims priority under 35 U.S.C. § 119 to Korean Patent Application No. 2007-0044869, filed on May 9, 2007, in the Korean Intellectual Property Office (KIPO), the contents of which are herein incorporated by reference in their entirety.

BACKGROUND OF THE INVENTION

1. Field of the Invention

The present invention relates to a terminal connected to a lamp for a liquid crystal display (LCD) device and a backlight assembly having the terminal. More particularly, the present invention relates to a terminal connected to a lamp for an LCD device, which may have a bent portion to prevent separation of the lamp and a backlight assembly having the terminal.

2. Description of the Related Art

A liquid crystal display (LCD) device displays an image using arrangement variation of liquid crystals in response to an electric field applied thereto. The liquid crystal is interposed between two glass substrates, and a voltage is applied to a transparent electrode, so that the arrangement of the liquid crystal, thereby changing light transmittance of the liquid crystal. The image may be displayed using transmission or reflection of light. The LCD device has various characteristics such as thin thickness, low power consumption, etc.

The LCD device is a non-emissive type display device that does not generate light so that a light source may be required for the LCD device. The LCD device may be a reflective type LCD device that displays ambient light as the light source. However, when the ambient light is used for the light source, the image may be dependent on the environment of the LCD device. Thus, the LCD device includes various independent light sources.

The independent light sources include an electro luminescence (EL) element, a light emitting diode (LED), a cold cathode fluorescent lamp (CCFL), a hot cathode fluorescent lamp (HCFL), etc. The CCFL has various characteristics such as long lifetime, low power consumption, thin thickness, etc.

The CCFL is electrically connected to a wire through an electrode to receive electric power. The wire is connected to the electrode through a terminal having metal.

A thin metal plate is cut and bent to form the terminal including a receiving member for receiving the electrode of the fluorescent lamp and a connecting member that holds the electrode to be connected to the electrode.

However, when the metal plate is bent to form the terminal, the receiving member having a rectangular bent portion may be outwardly bent so that the electrode may be separated from the receiving member. However, the terminal needs to contact the wire and the electrode solidly and firmly to deliver the electric power to the electrode stably and prevent defects such as a spark splash caused by unstable contact between the terminal and the electrode.

SUMMARY OF THE INVENTION

The present invention provides a terminal connected to a lamp for a liquid crystal display (LCD) device, which may have a bent portion to prevent separation of the lamp.

The present invention also provides a backlight assembly having the terminal.

A terminal for a backlight assembly in accordance with one aspect of the present invention includes a supporting plate, a holding member, a connection portion and a receiving portion. The holding member protrudes from a side of the supporting plate to surround a wire. The connection portion protrudes from an upper portion of the supporting plate and bent to hold an electrode of a lamp of the backlight assembly. The receiving portion protrudes and is bent from the connection portion. The receiving portion overlaps with at least a portion of the supporting plate.

The receiving portion may make contact with the conductive line of the wire and the supporting plate.

The receiving portion may be interposed between a conductive line of the wire and the supporting plate.

The supporting plate may have a substantially rectangular shape, and the holding member may be integrally formed with the supporting plate.

The holding member may have a substantially rectangular shape.

The receiving portion may have a smaller width than the connection portion.

The holding member may include a first holding plate bent to surround a conductive line of the wire and the receiving portion.

The holding member may include two first holding plates protruding from corresponding sides of the supporting plate.

The holding member may further include a second holding plate bent to surround a coating of the wire.

The holding member may include two second holding plates protruding from corresponding sides of the supporting plate.

The terminal may further include a cream solder layer on an inner surface of the connection portion.

The cream solder layer may include rosin.

The cream solder layer may extend toward an inner surface of the receiving portion.

A protrusion may be formed on an inner surface of the connection portion.

A backlight assembly in accordance with another aspect of the present invention includes a lamp, a wire and a terminal. The lamp includes an electrode. The wire transmits an electric power to the lamp. The terminal is connected between the lamp and the wire, and includes a supporting plate, a holding member, a connection portion and a cream solder layer. The holding member protrudes from a side of the supporting plate to surround the wire. The connection portion protrudes from an upper portion of the supporting plate and is bent to hold an the electrode of the lamp. The cream solder layer is on an inner surface of the connection portion.

The backlight assembly may further include a receiving portion that protrudes and is bent from the connection portion, and the receiving portion may overlap with at least a portion of the supporting plate.

A backlight assembly in accordance with still another aspect of the present invention includes a lamp, a wire and a terminal. The lamp includes an electrode. The wire transmits an electric power to the lamp. The terminal is connected between the lamp and the wire, and includes a supporting plate, a holding member, a connection portion and a receiving portion. The holding member protrudes from a side of the supporting plate to surround the wire. The connection portion protrudes from an upper portion of the supporting plate and is bent to hold the electrode of the lamp. The receiving portion protrudes and is bent from the connection portion. The receiving portion overlaps with at least a portion of the supporting plate.

The receiving portion may make contact with the conductive line of the wire and the supporting plate.

The receiving portion may be interposed between a conductive line of the wire and the supporting plate.

The backlight assembly may further include a cream solder layer on an inner surface of the connection portion.

A display device in accordance with further still another aspect of the present invention includes a backlight assembly and a display panel. The backlight assembly includes a lamp, a wire and a terminal. The lamp includes an electrode. The wire transmits an electric power to the lamp. The terminal is connected between the lamp and the wire, and a supporting plate, a holding member, a connection portion and a cream solder layer. The holding member protrudes from a side of the supporting plate to surround the wire. The connection portion protrudes from an upper portion of the supporting plate and bent to hold the electrode of the lamp. The cream solder layer is on an inner surface of the connection portion. The display panel is on the backlight assembly to display an image using light generated from the backlight assembly.

The display device may further include a receiving portion that protrudes and is bent from the connection portion, and the receiving portion may overlap with at least a portion of the supporting plate.

BRIEF DESCRIPTION OF THE DRAWINGS

The above and other advantages of the present invention will become more apparent by describing in detail example embodiments thereof with reference to the accompanying drawings, in which.

DESCRIPTION OF THE EMBODIMENTS

Figure 1:
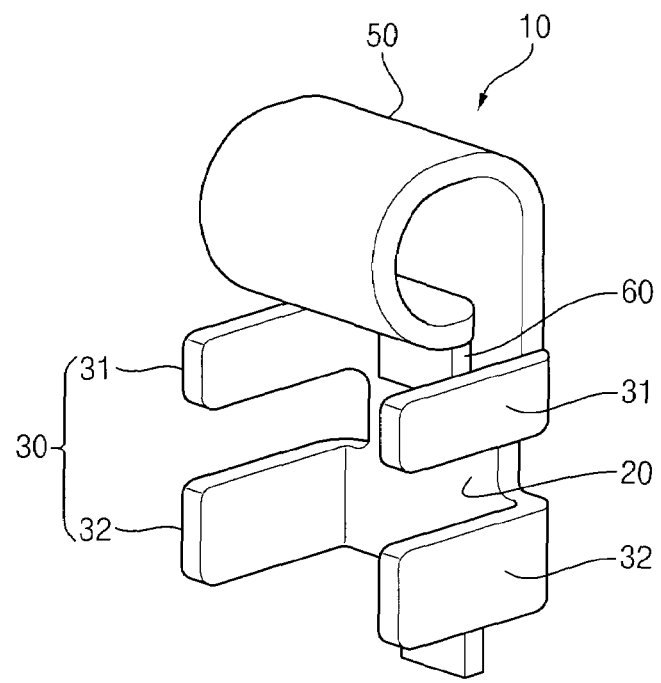
FIG. 1 is a perspective view illustrating a terminal in accordance with one embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
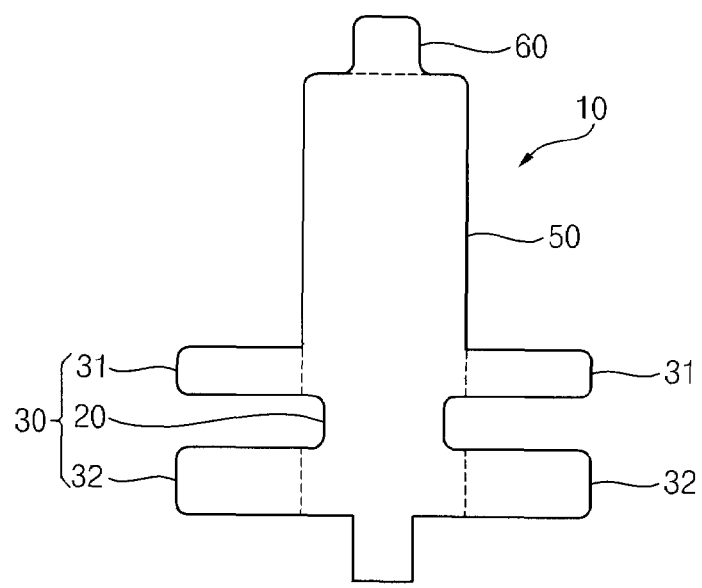
FIG. 2 is an expanded plan view illustrating the terminal of FIG. 1.

FIG. 1 is a perspective view illustrating a terminal in accordance with one embodiment of the present invention. FIG. 2 is an expanded plan view illustrating the terminal of FIG. 1.

Referring to FIGS. 1 and 2, the terminal 10 of a lamp for a liquid crystal display (LCD) device is molded to have a connection portion 50, a receiving portion 60 and a holding member 30.

In order to form the terminal 10, a metal plate is cut as shown in FIG. 2, and the cut metal plate is bent to form the terminal 10 shown in FIG. 1. Thus, the terminal 10 includes a supporting plate 20 having a substantially rectangular shape, and first and second holding plates 31 and 32 protrude from corresponding sides of the supporting plate 20. Also, a connection portion 50 is formed on an upper portion of the supporting plate 20, and a receiving portion 60 is formed on an end portion of the connection portion 50. In FIGS. 1 and 2, the number of the first holding plates 31 and the number of the second holding plates 32 are two. Alternatively, the terminal 10 may include only one first holding plate and one second holding plate. For example, a protrusion or an embossing pattern may be formed on an inner surface of the connection portion 50 so that the connection portion 50 may be securely combined with an electrode 350 (shown in FIG. 4A). When the protrusion or the embossing pattern is formed on the inner surface of the connection portion 50, a cream solder layer 70 (shown in FIG. 4A) may be filled into a space between a remainder of the inner surface of the connection portion 50 and the electrode 350 of the lamp.

The cream solder layer 70 increases an adhesive strength between the connection portion 50 and the electrode 350 of the lamp. Alternatively, the receiving portion 60 may be omitted, and the connection portion 50 may be fixed to the electrode 350 of the lamp through the cream solder layer 70.

The connection portion 50 is formed by folding and has a substantially circular shape, and an end portion of the folded portion adjacent to the receiving portion 60 overlaps with the supporting plate 20. Two first holding plates 31 surround a conductive part 250 (shown in FIG. 4A) of a wire 200 (shown in FIG. 4A) to hold the conductive part 250, and two second holding plates 32 surround a coating of the wire 200 to hold the coating. In FIGS. 1 and 2, the receiving portion 60 has a smaller width than the connection portion 50. The wire 200 transmits an electric power to the lamp 300.

Figure 3A:
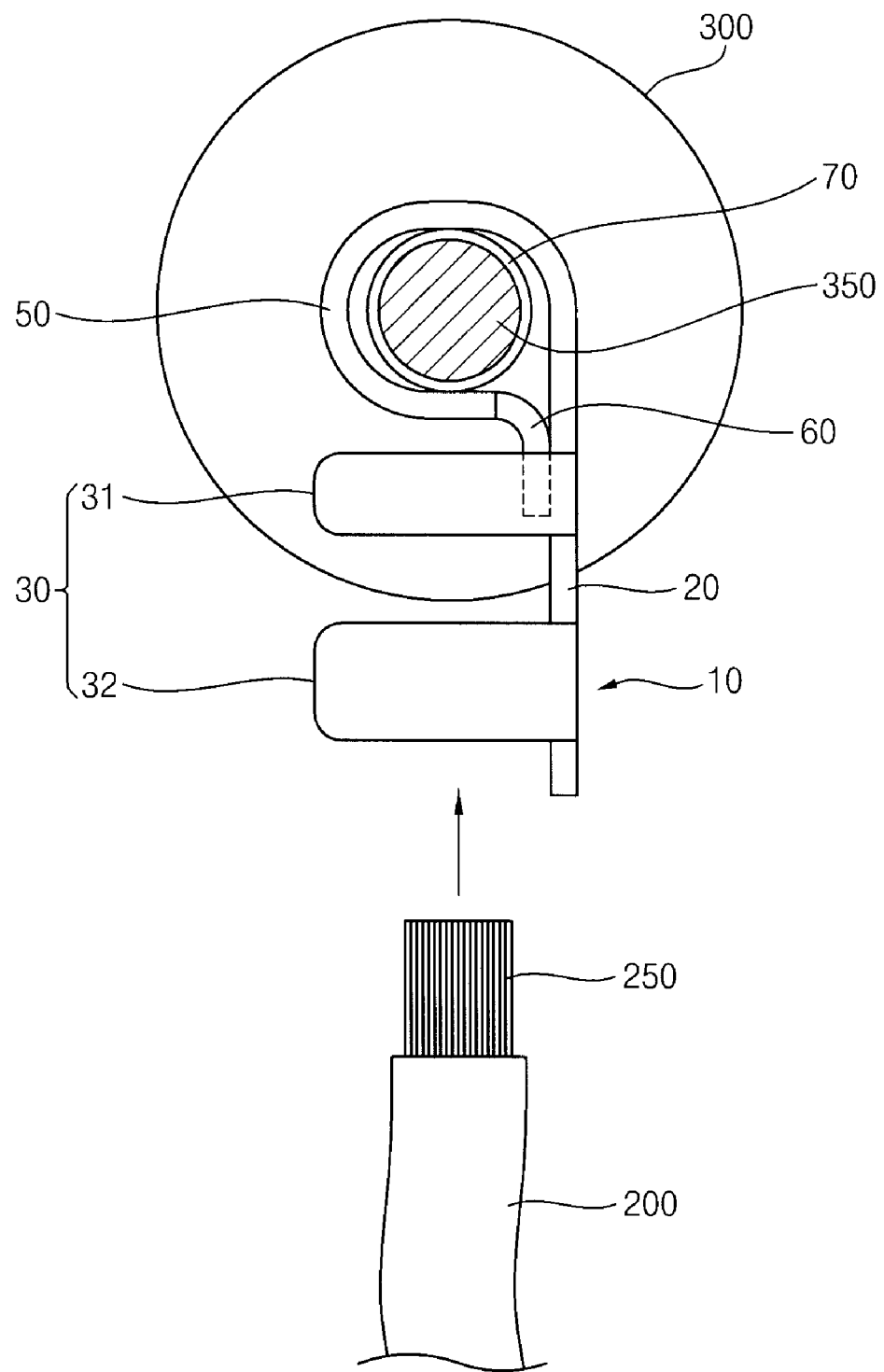
FIGS. 3A and 3B are cross-sectional views illustrating connection between a lamp and a wire in accordance with one embodiment of the present invention.
Figure 3B:
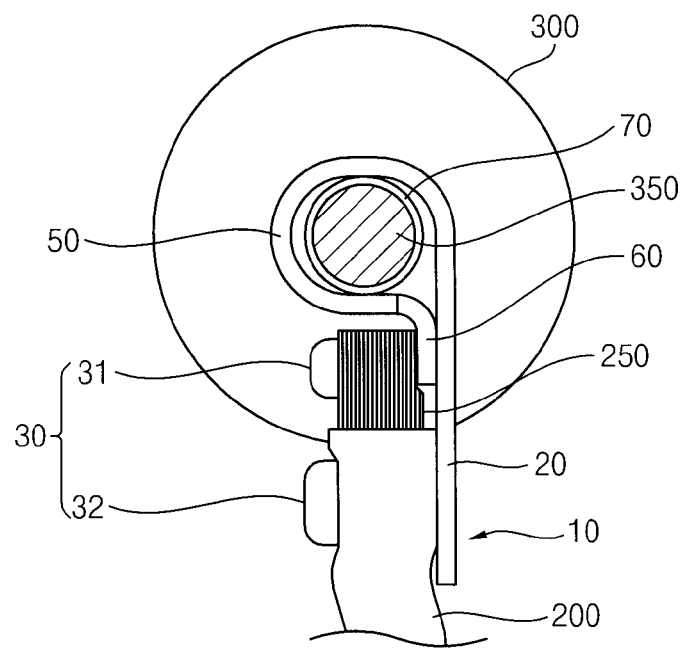
Figure 4A:
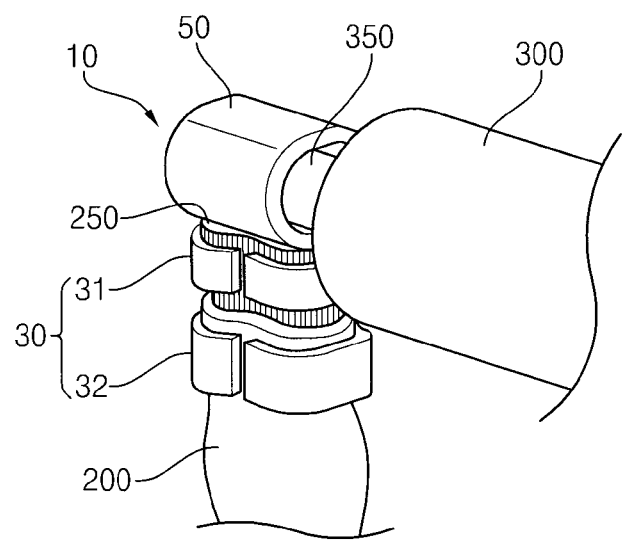
FIG. 4A is a perspective view illustrating the terminal connected to the wire shown in FIGS. 3A and 3B.
Figure 4B:
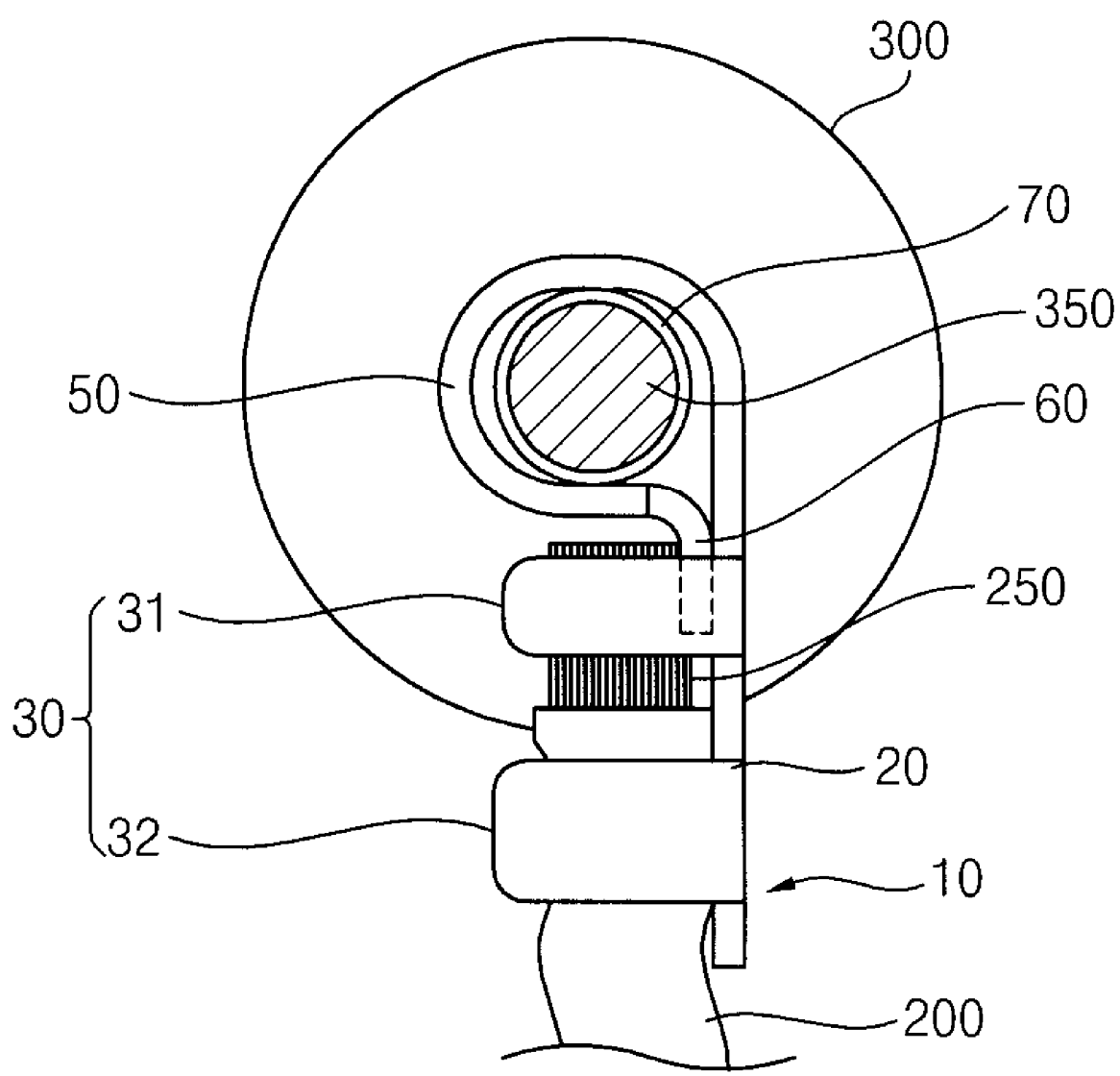
FIG. 4B is a cross-sectional view illustrating the terminal connected to the wire shown in FIGS. 3A and 3B.

FIGS. 3A and 3B are cross-sectional views illustrating connection between a lamp and a wire in accordance with one embodiment of the present invention. FIG. 4A is a perspective view illustrating the terminal connected to the wire shown in FIGS. 3A and 3B. FIG. 4B is a cross-sectional view illustrating the terminal connected to the wire shown in FIGS. 3A and 3B.

Referring to FIGS. 3A to 4B, an electrode 350 of the lamp is received in a hole formed by the connection portion 50. In FIG. 3A, a cream solder is coated on an inner surface of the connection portion 50 to form a cream solder layer 70. Alternatively, the cream solder may be coated on an outer surface of the electrode 350 so that the cream solder layer 70 may be interposed between the outer surface of the electrode 350 and the inner surface of the connection portion 50. In FIGS. 3A to 4B, the cream solder layer 70 is only disposed between the electrode 350 and the connection portion 50. Alternatively, an additional cream solder layer (not shown) may also be interposed between the receiving portion 60 and the supporting plate 20. The electrode 350 may be a lead line, a connection line, etc.

The cream solder may be formed by uniformly mixing a solder of a power or a liquid with a flux of a paste type at a predetermined ratio. The flux may include a rosin that may be formed by removing volatile material from turpentine that may be extracted from a pine tree. The rosin may include abietic acid. The rosin has various characteristics such as heat resistance, stability, low cost, etc., and has been used in various fields such as the flux for soldering. A lead compound may also be used for the flux, however, the lead may cause environmental problems. Thus, a lead free flux has been developed, and the cream solder of the present embodiment uses the lead free solder.

The electrode, on which the cream solder layer 70 is formed, is inserted into the hole formed by the connection portion 50, and the electrode and the cream solder layer 70 is heated so that the cream solder layer 70 is solidified. Thus, the electrode of the lamp is fixed to the connection portion, and makes a secure electric connection with the connection terminal 10.

Meanwhile, the cream solder layer 70 may be formed on an inner surface of the connection portion 50 before the electrode is inserted into the hole formed by the connection portion 50.

The cream solder layer 70 fixes the electrode to the connection portion 50 more stably because the cream solder layer 70 fills up the space between the electrode and the connection portion 50 and is solidified. Alternatively, the receiving portion 50 may be omitted from the backlight assembly according to a feature of a product because of the adherence of the cream solder.

Referring to FIG. 4B, the first holding plates 31 are bent inwardly to hold the conductive line 250 of the wire 200, and the second holding plates 32 surround the coating of the wire 200 to hold the wire 200. The conductive line 250 of the wire 200 is electrically connected to the terminal through the first holding plates 31, and the receiving portion 60 is interposed between the conductive line 250 and the supporting plate 200 so that the wire 200 is securely connected to the connection terminal 10. For example, the receiving portion 60 makes contact with the conductive line 250 and the supporting plate 200. Thus, the conductive line 250 is combined with the connection terminal 10 through the receiving portion 60 and the first holding plates 31, so that the shape of the connection portion 50 is not loosened by impact, thereby separation between the connection terminal 10 and the electrode 350 is prevented.

Figure 5:
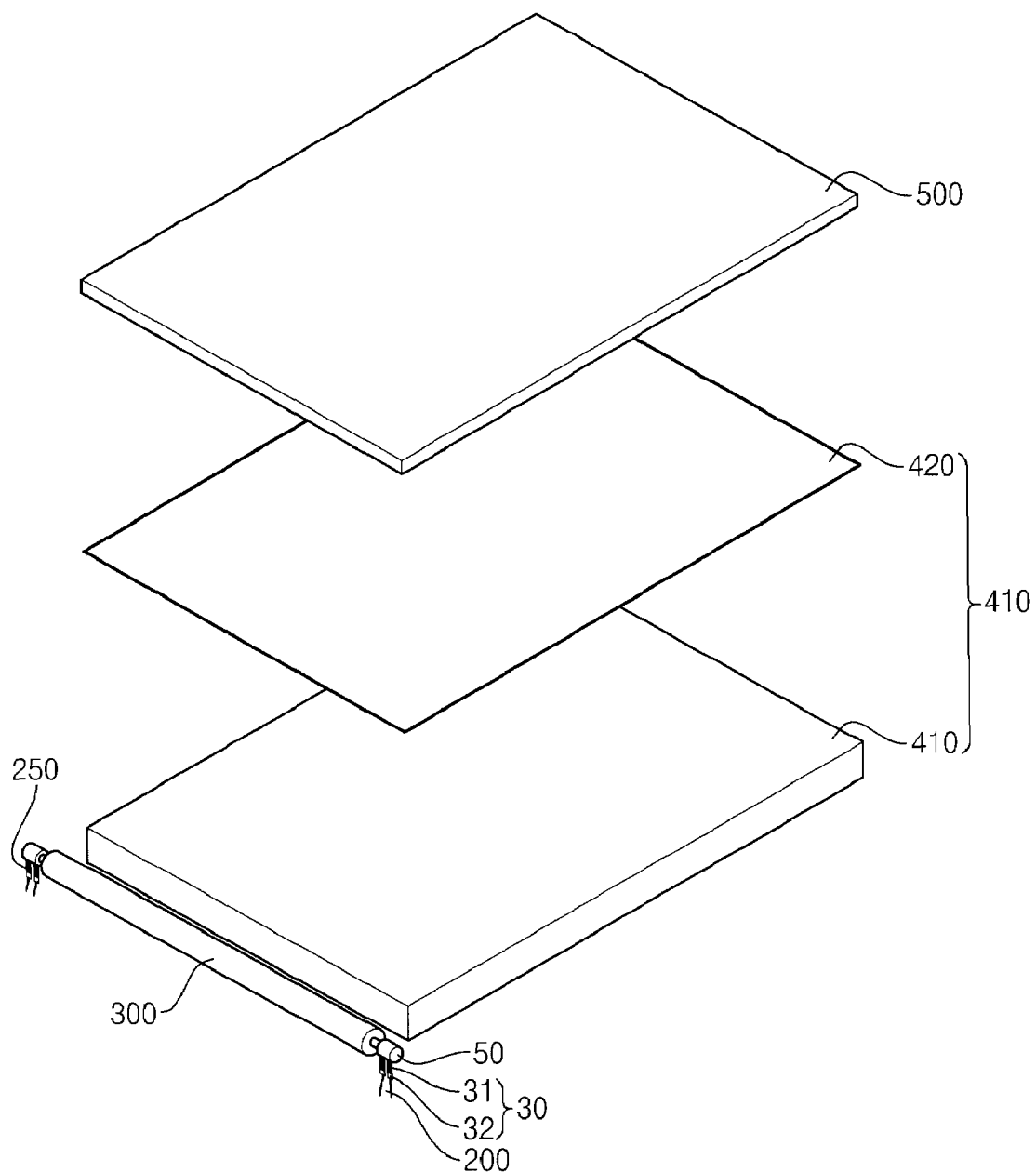
FIG. 5 is an exploded perspective view illustrating a display device having the terminal shown in FIGS. 3A and 3B.

FIG. 5 is an exploded perspective view illustrating a display device having the terminal shown in FIGS. 3A and 3B.

Referring to FIG. 5, the display device includes a backlight assembly 400 and a display panel 500.

The backlight assembly 400 includes a lamp 300, a wire 200 transmitting an electric power to the lamp 300, a terminal 30 connected between the lamp 300 and the wire 200, a light guiding plate 410 and an optical sheet 420.

The terminal 30 of FIG. 5 is the same as in FIGS. 1 to 4B. Thus, the same reference numerals will be used to refer to the same or like parts as those described in FIGS. 1 to 4B and any further explanation concerning the above elements will be omitted.

The lamp 300 is on a side surface of the light guiding plate 410. Light generated from the lamp 300 and incident to the light guiding plate 410 through the side surface is changed into a planar light. The planar light exits the light guiding plate 410 and is guided toward the optical sheet 420. In FIG.

5, the backlight assembly 400 is an edge illumination type backlight assembly. Alternatively, the backlight assembly may be a direct illumination type backlight assembly that includes a diffusion plate (not shown) and a plurality of lamps disposed under the diffusion plate.

The display panel 500 is on the backlight assembly 400 to display an image using the light generated from the backlight assembly 400.

According to the present invention, the electrode of the lamp is securely fixed to the connection portion of the terminal through the cream solder layer, and the receiving portion connected to an end portion of the connection portion is securely fixed between the conductive line of the wire and the supporting plate, so that the separation of the lamp from the terminal is prevented.

This invention has been described with reference to the example embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A terminal for a backlight assembly, comprising:
a supporting plate having a substantially rectangular shape;
a holding member protruding from a side of the supporting plate to surround a wire;
a connection portion protruding from an upper portion of the supporting plate and bending to hold an electrode of a lamp of the backlight assembly; and
a receiving portion that protrudes from an end portion of the connection portion,
wherein the receiving portion adheres to the supporting plate, when the holding member bands and surrounds a conductive line of the wire which makes contact with the receiving portion.

2. The terminal of claim 1, wherein the receiving portion is to be interposed between the conductive line of the wire and the supporting plate.

3. The terminal of claim 1, wherein the holding member is integrally formed with the supporting plate.

4. The terminal of claim 1, wherein the holding member has a substantially rectangular shape.

5. The terminal of claim 1, wherein the receiving portion has a smaller width than the connection portion.

6. The terminal of claim 1, wherein the holding member comprises a first holding plate bent to surround the conductive line of the wire and the receiving portion.

7. The terminal of claim 6, wherein the holding member comprises two first holding plates protruding from corresponding sides of the supporting plate.

8. The terminal of claim 6, wherein the holding member further comprises a second holding plate bent to surround a coating of the wire.

9. The terminal of claim 8, wherein the holding member comprises two second holding plates protruding from corresponding sides of the supporting plate.

10. The terminal of claim 1, further comprising a cream solder layer on an inner surface of the connection portion.

11. The terminal of claim 10, wherein the cream solder layer comprises rosin.

12. The terminal of claim 10, wherein the cream solder layer extends toward an inner surface of the receiving portion.

13. The terminal of claim 1, wherein a protrusion is formed on an inner surface of the connection portion.

14. A backlight assembly comprising:
a lamp including an electrode;
a wire to transmit an electric power to the lamp; and
a terminal connected between the lamp and the wire, the terminal comprising:
a supporting plate having a substantially rectangular shape;
a holding member protruding from a side of the supporting plate to surround the wire;
a connection portion protruding from an upper portion of the supporting plate and bending to hold the electrode of the lamp; and
a receiving portion that protrudes from the connection portion,
wherein a conductive line of the wire makes contact with the receiving portion, and the holding member surrounds the conductive line of the wire, so that the receiving portion adheres to the supporting plate.

15. The backlight assembly of claim 14, wherein the receiving portion is interposed between the conductive line of the wire and the supporting plate.

16. The backlight assembly of claim 14, further comprising a cream solder layer on an inner surface of the connection portion.

17. A display device comprising:
a backlight assembly comprising:
a lamp including an electrode;
a wire to transmit an electric power to the lamp; and
a terminal connected between the lamp and the wire, the terminal comprising:
a supporting plate having a substantially rectangular shape;
a holding member protruding from a side of the supporting plate to surround the wire;
a connection portion protruding from an upper portion of the supporting plate and bending to hold the electrode of the lamp; and
a receiving portion that protrudes from the connection portion, wherein a conductive line of the wire makes contact with the receiving portion, and the holding member surrounds the conductive line of the wire, so that the receiving portion adheres to the supporting plate; and
a display panel on the backlight assembly to display an image using light generated from the backlight assembly.

18. The display device of claim 17, further comprising a cream solder layer on an inner surface of the connection portion.

* * * * *